US006876463B2

(12) United States Patent
Livingston

(10) Patent No.: US 6,876,463 B2
(45) Date of Patent: Apr. 5, 2005

(54) METHOD AND CONTROL FOR SUMMARIZING DISTRIBUTION OF PAGE-SPECIFIC FEATURES WITHIN A MULTI-PAGE PRINT JOB

(75) Inventor: Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 10/625,066

(22) Filed: Jul. 22, 2003

(65) Prior Publication Data

US 2004/0196499 A1 Oct. 7, 2004

Related U.S. Application Data

(63) Continuation of application No. 09/430,382, filed on Oct. 29, 1999, now Pat. No. 6,621,590.

(51) Int. Cl.[7] .............................................. G06F 15/00
(52) U.S. Cl. ...................... 358/1.15; 358/1.18; 358/452
(58) Field of Search ........................ 358/1.1, 1.5, 1.11, 358/1.12, 1.13, 1.15, 1.18, 448, 452, 453

(56) References Cited

U.S. PATENT DOCUMENTS

| 5,859,638 | A | | 1/1999 | Coleman et al. | |
|---|---|---|---|---|---|
| 5,953,007 | A | | 9/1999 | Center et al. | 345/339 |
| 6,134,568 | A | * | 10/2000 | Tonkin | 715/526 |
| 6,301,586 | B1 | * | 10/2001 | Yang et al. | 707/104.1 |
| 6,471,325 | B2 | * | 10/2002 | Abe | 347/19 |
| 6,587,129 | B1 | * | 7/2003 | Lavendel et al. | 715/776 |

FOREIGN PATENT DOCUMENTS

EP 0936535 A2 8/1999

OTHER PUBLICATIONS

European Search Report for Application No. EP00112171; dated Sep. 9, 2004.

* cited by examiner

Primary Examiner—Mark Wallerson

(57) ABSTRACT

A method of displaying a print preview image of a selected page in a document includes displaying a list of user-selectable printing features, receiving a selection of one of the user-selectable printing features, displaying a user-actuable control for the selected one of the features, displaying a print preview image which changes in response to actuation of the user-actuable control, displaying a page selector adjacent the print preview image for selecting a page to be displayed in the print preview image and displaying indicia showing which pages within the document have had the selected one of the features from the list altered from a default setting for that feature.

20 Claims, 6 Drawing Sheets

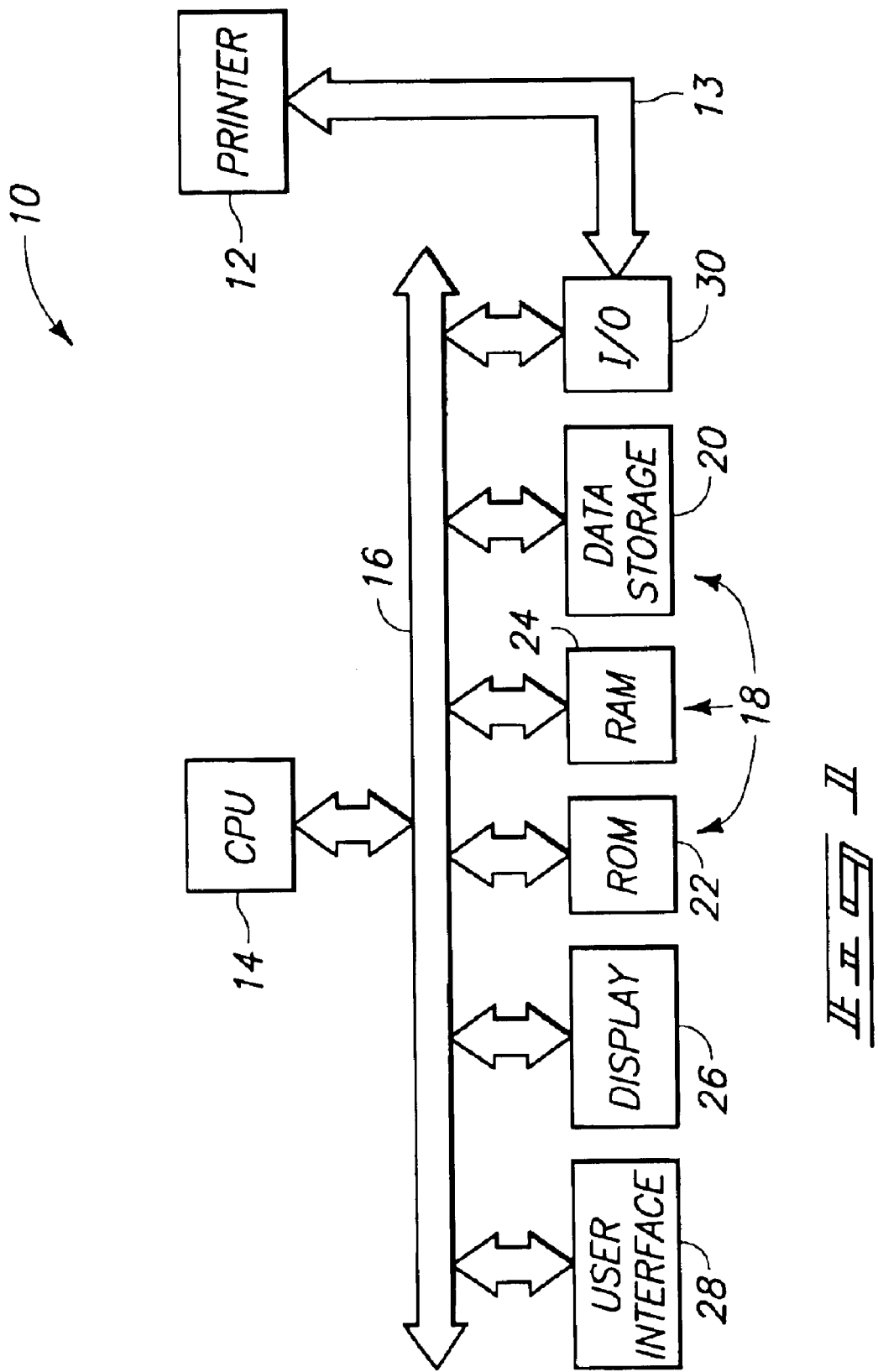

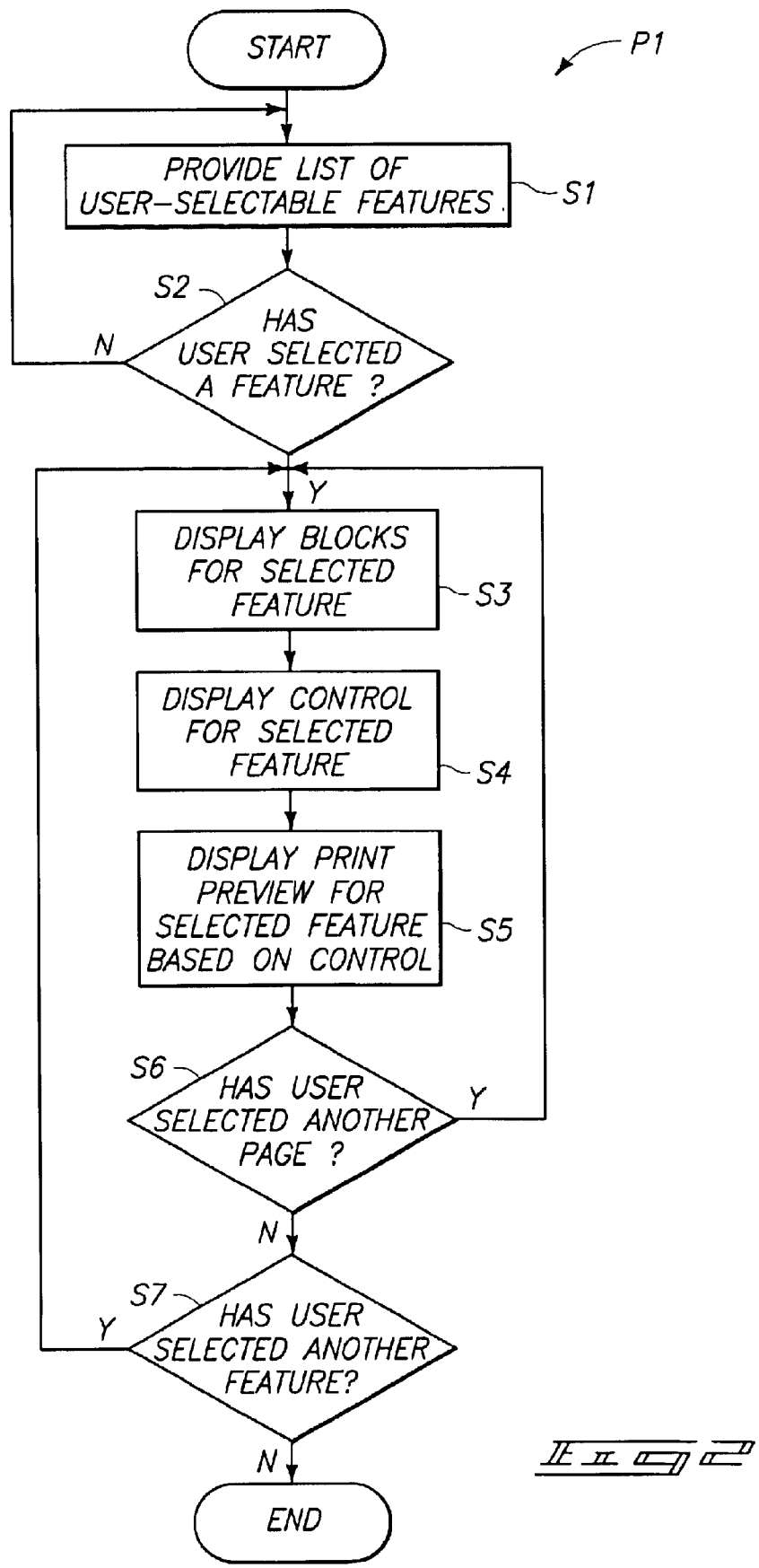

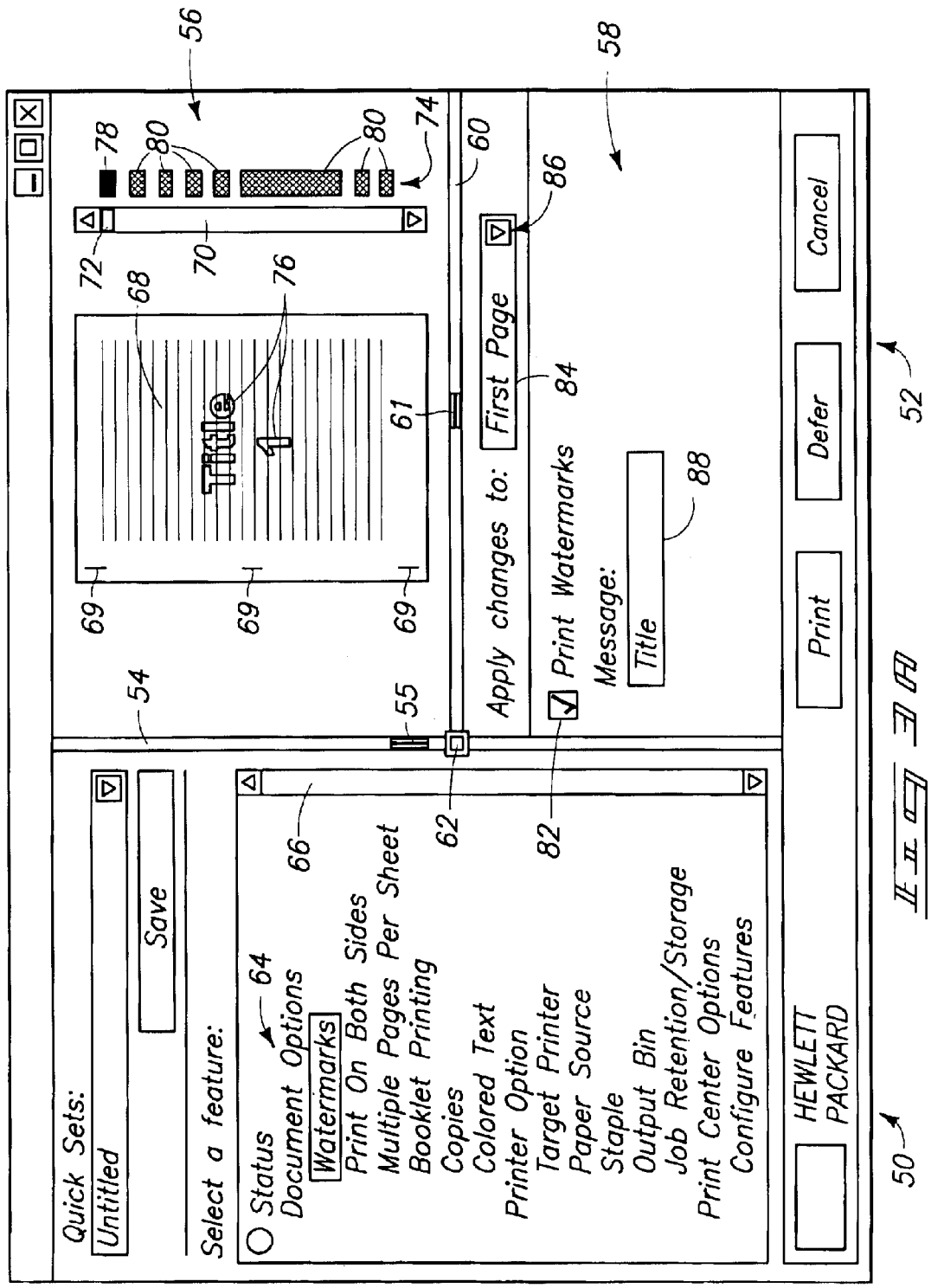

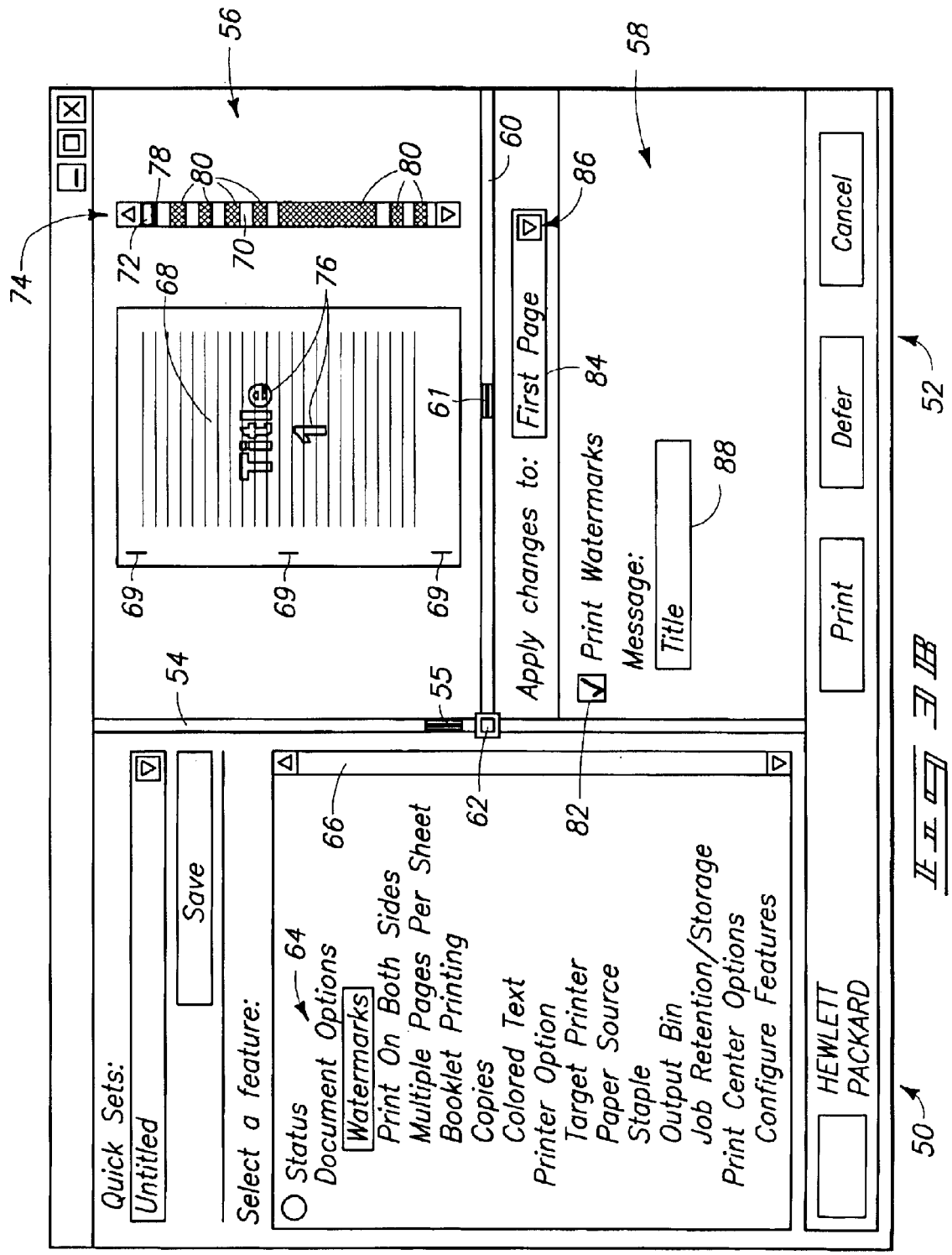

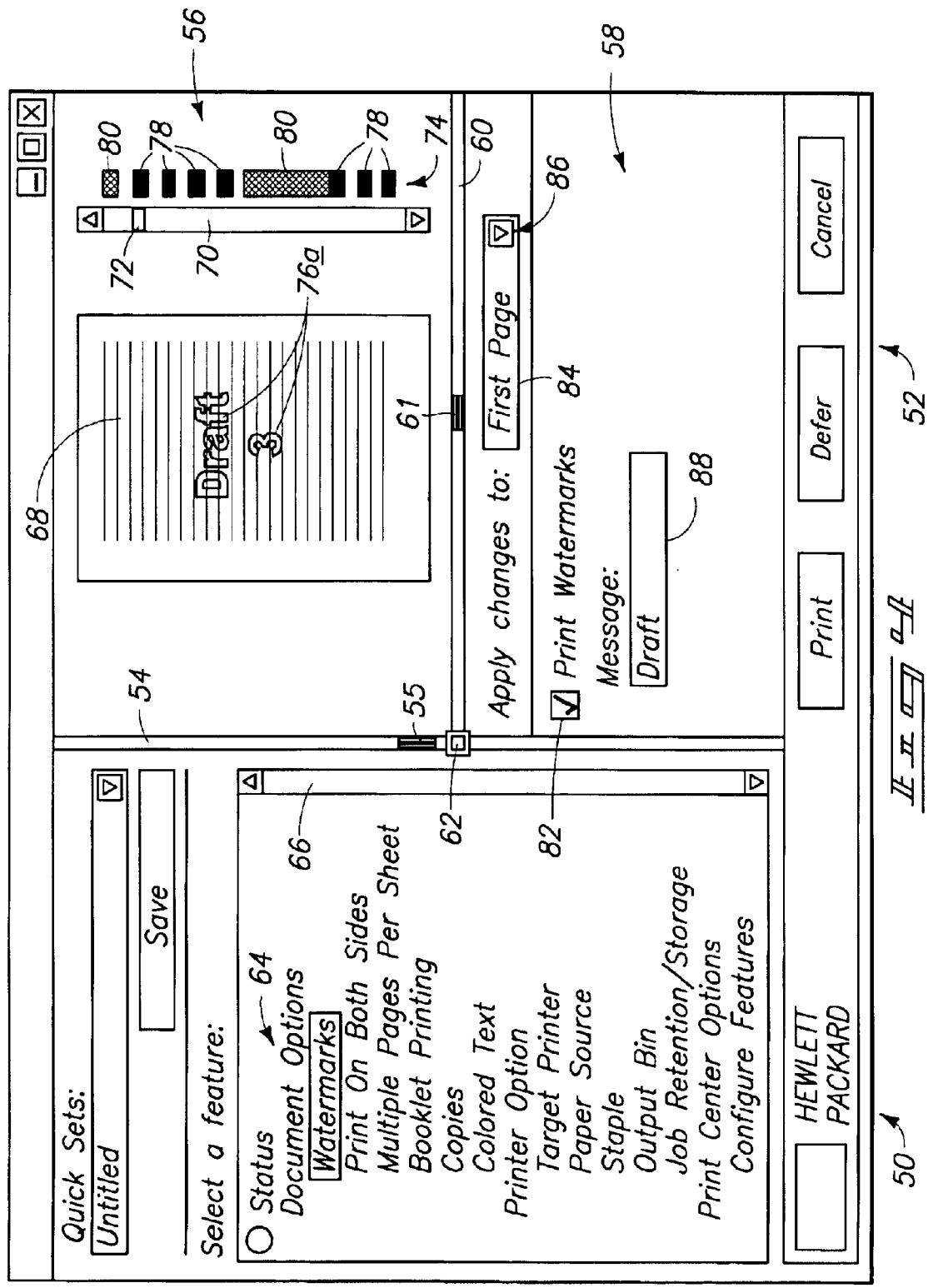

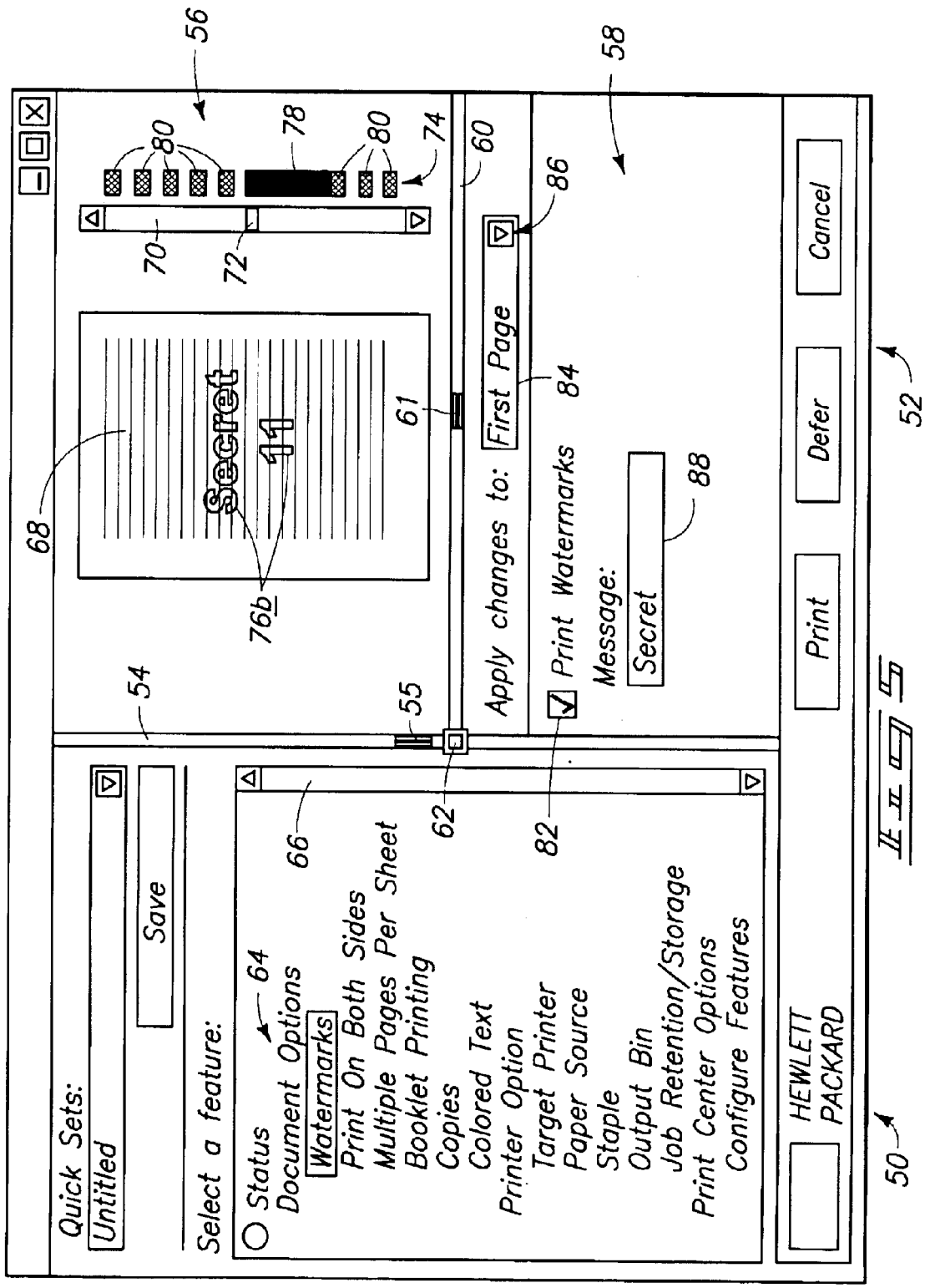

METHOD AND CONTROL FOR SUMMARIZING DISTRIBUTION OF PAGE-SPECIFIC FEATURES WITHIN A MULTI-PAGE PRINT JOB

CROSS-REFERENCE TO RELATED APPLICATION

This is a continuation of U.S. patent application Ser. No. 09/430,382, which was filed Oct. 29, 1999 now U.S. Pat. No. 6,621,590, titled "Method and Control for Summarizing Distribution of Page-Specific Features within a Multi-Page Print Job', naming Kris R. Livingston as inventor, which is incorporated herein by reference.

FIELD OF THE INVENTION

The invention relates to printers and computer networks. More particularly, the invention relates to selection of print features.

BACKGROUND OF THE INVENTION

Over the last several decades, computer systems have become increasingly complex, and, at the same time, have been modified to provide increasing numbers of options, capabilities and customization features for specific tasks. Printer technology is a dramatic example of the increased capabilities that even modest modern computer systems offer compared to those of a few decades ago. Widespread adoption of features allowing on-the-fly modification of print parameters (e.g., font, print size, mixed graphic/text output, selection of multiple printers, paper sources etc.) permit very complex printer operations to be carried out with relative ease, compared to what is possible with older print technologies, such as those using daisy-wheel printing systems.

The increased capabilities found within modern printer systems requires increased sophistication in the commands that are sent to the printer in order to carry out the user's desired print options. In turn, the user has a larger number of options to select in composing a document to be printed. As a result, the need to be able to organize and to display printer options in a compact, organized and user-friendly fashion has grown dramatically.

SUMMARY OF THE INVENTION

In accordance with an aspect of the present invention, a method of displaying a print preview image of a selected page in a document includes displaying a list of user-selectable printing features and receiving a selection of one of the user-selectable printing features. The method also includes displaying a user-actuable control for the selected one of the features, displaying a print preview image which changes in response to actuation of the user-actuable control and displaying a page selector adjacent the print preview image for selecting a page to be displayed in the print preview image. The method further includes displaying indicia showing which pages within the document have had the selected one of the features from the list altered from a default setting for that feature.

In accordance with another aspect of the present invention, an article of manufacture includes a computer usable medium having computer readable code embodied therein to cause a display to depict a graphical user interface for setting printer options. The graphical user interface includes a first portion showing a list of print features, a second portion and a first divider separating the first and second portions. The second portion includes a first sub portion displaying a print preview image corresponding to a user-selected page within a document, a second sub portion and a second divider separating the first and second sub portions. The computer readable program code in the article of manufacture is configured to display a list of user-selectable printing features in the first portion, receive a selection of one of the user-selectable printing features and display a user-actuable control for the selected one of the features in the second sub portion. The computer readable program code in the article of manufacture is also configured to display a print preview image in the first sub portion which changes in response to actuation of the user-actuable control, display a page selector adjacent the print preview image for selecting a page to be displayed in the print preview image and display indicia showing which pages within the document have had the selected one of the features from the list altered from a default setting for that feature.

In accordance with yet another aspect of the present invention, a computer implemented printer control system includes memory configured to provide an operating system and operative to store files representing at least one document to be printed and a display configured to provide an image of a graphical user interface in a viewing window. The graphical user interface is configured to allow user selection and modification of print engine options for printing the document and processing circuitry. The processing circuitry is configured to display a list of user-selectable printing features in a first portion of the graphical user interface, receive a selection of one of the user-selectable printing features and display a user-actuable control for the selected one of the features in a second portion of the graphical user interface. The processing circuitry is further configured to display a print preview image in a second portion which changes in response to actuation of the user-actuable control, display a page selector adjacent the print preview image for selecting a page to be displayed in the print preview image and display indicia showing which pages within the document have had the selected one of the features from the list altered from a default setting for that feature.

Other features and advantages of the invention will become apparent to those of ordinary skill in the art upon review of the following detailed description, claims and drawings.

DESCRIPTION OF THE DRAWINGS

FIG. 1 is a simplified block diagram of a computer system and printer, in accordance with an embodiment of the present invention.

FIG. 2 is a simplified flowchart illustrating a process, in accordance with an embodiment of the present invention.

FIGS. 3 through 5 show simplified views of a graphical user interface for controlling the printer of FIG. 1 using the process shown in the flow chart of FIG. 2, in accordance with an embodiment of the present invention.

DETAILED DESCRIPTION OF THE INVENTION

FIG. 1 is a simplified block diagram of a computer system 10 and printer 12 coupled together via a bus 13, in accordance with an embodiment of the present invention. The computer system 10 includes a central processing unit (CPU) 14 that is coupled to a data and address bus 16. The data and address bus 16 is coupled to a memory system 18. The memory system 18 includes nonvolatile mass data storage device 20, which may include a CD ROM, floppy drive, hard drive, zip drive, floptical storage, optical storage, tape storage or other forms of data storage and retrieval devices known in the art. The memory system 18 also includes a read only memory (ROM) 22 and a random access memory (RAM) 24. In one embodiment, the computer system 10 includes the memory system 18 or other computer readable medium bearing software that will be described below. A display 26 and a user interface 28 are also coupled to the CPU 14 through the data and address bus 16. The computer system 10 includes I/O devices 30 coupled to the data and address bus 16 to promote data communications between the computer system 10 and external data processing and conditioning devices, including the printer 12. It will be appreciated that more complex computer systems are also used in conjunction with printers 12, however, for clarity of explanation and ease of understanding, the present invention will be described in the context of the computer system 10 of FIG. 1.

In one embodiment, the user interface 28 includes a keyboard and a cursor manipulating tactile input device, such as a mouse or a touchpad. However, it is understood that other forms of input devices can also be used including voice recognition systems, joysticks, graphics tablets, data readers, card readers, magnetic and optical readers, other computer systems etc. The user receives visual feedback via the display 26. According to one construction, the display 26 comprises a graphics display terminal, such as a CRT display or a liquid crystal display. The user enters commands and text via the user interface 28 and observes feedback from the computer system using the display 26. The CPU 14 operates on data using modules composed of lines of code that typically are stored in RAM 24, in response to the commands from the user, and provides results that may be stored in the memory system 18, displayed on the display 26 or that may be communicated to other devices external to the computer system 10, such as the printer 12. The modules may or may not be defined by a subroutine separate from a main program. It will be understood that while the invention is described in terms of a computer system 10 and a printer 12, it may also be practiced in systems that include multiple computers, such as servers and the like.

FIG. 2 is a simplified flowchart illustrating a process P1 in accordance with one aspect of the invention. The process P1 begins with a step S1. In step S1, the process P1 provides a list of user-selectable features via a portion of the display 26 of FIG. 1. In a query task S2, the process P1 determines if the user has selected a feature from the list. When the user has not selected a feature from the list, control passes back to the step S1. When the user has selected a feature from the list, control passes to a step S3. In the step S3, the process P1 displays a series of blocks corresponding to pages of a document to be printed and to the selected feature via the display 26 of FIG. 1, and control passes to a step S4. In the step S4, controls corresponding to the selected feature are displayed via a portion of the display 26. In a step S5, a print preview image for a selected page (which may be a default page such as page 1) is displayed via a portion of the display 26 and control passes to a step S6. The series of blocks show the user which pages have had the selected feature altered from a default setting and also show which pages of the document have had the selected feature set to the setting of the page corresponding to the print preview image.

In the query task S6, the process P1 determines if the user has selected a different page for the print preview image. When the user has not selected a different page for the print preview image, control passes to a step S7. When the query task S6 determines that the user has selected a new page for the print preview image, steps S3 through S5 are iterated to update the series of blocks, the control settings in the controls and the print preview image shown on the display 26 to correspond to the new page selection.

In the query task S7, the process P1 determines if the user has selected a different feature from the list of features displayed in the step S1. When the user has not selected another feature, the process P1 ends. When the user has selected another feature, the steps S3 through S6 are iterated to update the series of blocks, the controls and the print preview image to correspond to the revised feature selection.

FIGS. 3 through 5 provide simplified views of a graphical user interface for controlling the printer 12 of FIG. 1 using the process P1 shown in the flow chart of FIG. 2, in accordance with an embodiment of the present invention. FIG. 3A shows a first screen portion 50 and a second screen portion 52 that are separated by a first divider 54.

In one embodiment, a first affordance 55 is provided at a midpoint of the first divider 54. As used herein, the term "affordance" is defined to mean a visible feature having a characteristic from which the user infers (imagines) the operation method. In the illustrated example, the first affordance 55 is formed by vertical lines resembling ridges that are intended to suggest to the user that the first divider 54 may be moved by the user. In one embodiment, the first affordance 55 includes the entire first divider 54. In one embodiment, the first affordance 55 includes less than the entire first divider 54. In one embodiment, the first affordance 55 may be positioned at any position along the first divider 54. In one embodiment, the position of the first affordance 55 may be adjusted by the user.

In one embodiment, the second screen portion 52 is separated into a first sub portion 56 and a second sub portion 58. The first sub portion and the second sub portion are separated from one another by a second divider 60. In one embodiment, a second affordance 61 is located at a midpoint of the second divider 60. In one embodiment, the second affordance 61 includes the entire second divider 60. In one embodiment, the second affordance 61 includes less than the entire second divider 60. In one embodiment, the second affordance 61 may be positioned at any position along the second divider 60. In one embodiment, the position of the second affordance 61 may be adjusted by the user.

In FIGS. 3 through 5, the first divider 54 and the second divider 60 are shown as bars having a width great enough to facilitate easy positioning of, for example, a mouse-driven cursor, on the affordances 55 and 61, in order to be able to "click and drag" the dividers 56 or 60 to new locations.

In one embodiment, a third affordance 62 is formed at an intersection of the first 54 and second 60 dividers. In the illustrated examples, the third affordance 62 is denoted by a square positioned at a junction of the first 56 and second 60 dividers. Relative sizes of the first 50 and second 52 portions, as well as the first 56 and second 58 sub portions, may be simultaneously adjusted by a user by dragging the third affordance 62 in any direction. In one embodiment, an input device in the user interface 28 of FIG. 1, such as a mouse, may be used to "click and drag" the first divider 54 or the first affordance 55 left or right to adjust relative sizes of the first 50 and second 52 portions. Other devices for user input, such as touch screens, joy sticks or graphics tablets, may be used instead of or in addition to a mouse. In one embodiment, the input device may be used to click and drag the second divider 60 or the second affordance 61 to adjust relative sizes of the first 56 and second 58 sub portions.

When the amount of information that is to be shown in the first 56 or second 58 sub portions exceeds what may be displayed without compromise of readability, scroll bars are generated to allow portions of the information to be clearly viewed under user control.

A list of printer features 64 is displayed in the first portion 50, together with a scroll bar 66. This allows the user to rapidly scan features in the list 64 and to select features in the list 64 for modification from their default settings. When the user selects a feature from the list 64, that feature is shown in a visually distinct manner. In the example of FIG. 3, the "Watermarks" feature is selected on the list 64, and is displayed as a negative image (denoted by a box surrounding the "Watermarks" feature entry in FIG. 3A), in contrast to other features on the list 64. When a feature is selected from the list 64, the second sub portion 58 is used to display controls for that feature. In the example shown in FIG. 3A, the controls for the "Watermarks" feature include a control 82 for selecting the option "Print Watermarks." When the "Print Watermarks" feature is selected via the control 82, choices of watermark options are offered in two different places: a pull-down menu 84 for selecting pages, using a button 86, to which to apply the watermark, and a user-accessible editable text box 88 in which to specify the watermark to be applied to the selected page or pages.

Other features in the list 64 that may be user-selectable include "Print on Both Sides," "Multiple Pages per Sheet," "Booklet Printing," "Copies" and "Colored Text." Printer selection features may include selection of a target printer, selection of a paper source (or size), selection of an output bin and the like. Selection of one of these features will cause the controls displayed in the second sub portion 58 to change to the controls appropriate for the feature that is currently selected using the process P1 of FIG. 2.

In the embodiment illustrated in FIG. 3A, the first sub portion 56 displays a print preview image 68, a scroll bar 70 and a button 72 together with a series of blocks 74 adjacent the scroll bar 70. Each of the blocks in the series 74 represents a page in the document. The scroll bar 70 allows the user to select a specific page in the document for the print preview image 68 by moving the button 72, while the series of blocks 74 show which pages have watermarks 76 applied to them, with neutral blocks (blocks that are identical to the background) corresponding to pages that do not have watermarks 76 applied to them. In the example of FIG. 3A, the watermark 76 "Title" has only been applied to page one, which is represented by a black block 78. Other watermarks have been applied to other pages of the document, as represented by dark gray blocks 80, shown as cross-hatched blocks in FIG. 3A. The dark gray blocks 80 indicate that the "watermark" feature has been altered from the default setting for the corresponding pages but is not the same as the watermark feature 76 applied to the page corresponding to the print preview image 68. In FIG. 3A, the series of dark gray blocks 80 appear in positions corresponding to pages 3, 5, 7, 9, 11–15,17 and 19. The print preview image 68 shows the page selected by the button 72 in the scroll bar 70 as it will appear when it is printed by the printer 12 of FIG. 1.

FIG. 3B is similar to FIG. 3A, but shows the series of blocks 74 superposed within the scroll bar 70 and button 72, rather than adjacent the scroll bar as shown in FIG. 3A. This configuration allows some savings of space in the graphical user interface.

The second sub portion 58 is used to display controls for the feature selected from the list of features 64. In the examples of FIGS. 3 through 5, the selected feature is the "Watermarks" feature. In order to alter the "Watermarks" feature, the user first selects pages to which the watermark 76 is to be applied may be selected using a control 84. The control 84 is shown as including a pull-down menu actuated by a button 86. The user then specifies that a watermark is to be changed using a user-selectable control 82, and the user is able to specify the content of the watermark 76 by entering text in a user-editable text box 88. It will be appreciated that the controls 84 and 88 may be of either type, that is, responsive to selections made from a button-activated menu or to text entries made by the user, and that these features may be combined to allow the user to either select from a list or enter text labels.

The user can use the dark gray blocks 80 or the neutral blocks to change the print preview image 68 to correspond to a selected page by manipulating a cursor to select that block and then selecting the block, for example, with a click of a mouse. The button 72 on the scroll bar 70 is then updated to reflect the page that the user has selected, and the series of blocks 74 is automatically updated to reflect the relationship of the newly-selected page to the rest of the document. FIG. 4 corresponds to the user selecting page 3.

FIG. 4 shows the first 50 and second 52 portions of the viewing screen, but with page 3 selected by the button 72 in the scroll bar 70 for the print preview image 68. As a result, the second sub portion 58 still displays controls for the "Watermarks" feature, but with parameters appropriate to page 3 of the document. The black blocks 78 now correspond to pages 3, 5, 7, 9, 15, 17 and 19, indicating that a watermark 76a "Draft" has been applied to these pages. The text appearing in the user-editable text box 88 also reflects the text content of the watermark 76a. Dark grey blocks 80 correspond to pages 1 and 11–14, indicating that watermarks 76 corresponding to these pages have been altered from their default setting and that they are not the same as the watermark 76a being shown in the print preview image 68. The control 84 still refers to the first page because the user has not selected a different target page or pages using the button 86. By clicking on the dark gray block 80 corresponding to page 11, the user will be provided with the display illustrated in FIG. 5.

FIG. 5 shows the first 50 and second 52 portions of the viewing screen, but with page 11 selected by the button 72 in the scroll bar 70 for the print preview image 68. As a result, the second sub portion 58 still displays controls for the "Watermarks" feature, but with parameters appropriate to page 11 of the document. The black blocks 78 now correspond to pages 11 through 14, and the watermark 76b displayed on the print preview image 68 reads "Secret." This tells the user that pages 11 through 14 all have the watermark 76b corresponding to "Secret." The dark gray blocks 80 corresponding to pages 1, 3, 5, 7, 9, 15, 17 and 19 show that these pages have watermark features that are different from the default settings and from the setting for pages 11 through 14.

In one embodiment, when a feature has been selected for all pages of a document and the settings are the same for all of those features, the black blocks 78 and dark gray blocks 80 disappear. This provides a simpler display. In one embodiment, the blocks 78 and 80 are rendered in color and may include icons or text representative of either the feature or of the page (e.g., a number). When the user selects another feature, such as "Paper Source" from the list of features 64, the blocks 78 and 80 are automatically redrawn to correspond to the distribution of the Paper Source settings across the document.

In the embodiments shown in FIGS. 3 through 5, the control 84 continues to show "First Page" as the page to which changes are applied to, even though the illustrations of FIGS. 4 and 5 correspond to pages 3 and 11, respectively. If changes to the controls are made, those changes will be applied to the page or pages specified in the control 84, which may be altered using the button 86. It will be appreciated that other arrangements are possible.

The protection sought is not to be limited to the disclosed embodiments, which are given by way of example only, but instead is to be limited only by the scope of the appended claims.

What is claimed is:

1. A method of displaying a print preview image of a selected page in a document comprising:
    displaying a list of user-selectable printing features;
    receiving a selection of one of the user-selectable printing features;
    displaying a user-actuable control for the selected one of the features;
    displaying a print preview image, illustrating content of the selected page, which changes in response to actuation of the user-actuable control;
    displaying a page selector adjacent the print preview image for selecting a page to be displayed in the print preview image; and
    displaying indicia, separate from the print preview image, showing which pages within the document have had the selected one of the features from the list altered from a default setting for that feature.

2. The method of claim 1, further comprising displaying the list of user-selectable features as a scrollable list.

3. The method of claim 1, further comprising receiving a print command prior to displaying the list of user-selectable printing features.

4. The method of claim 1, wherein displaying indicia comprises displaying first indicia to indicate pages for which the selected one of the features has not been altered from the default setting, displaying second indicia to indicate pages for which the selected one of the features is set to the same setting as that of the page corresponding to the print preview image and displaying third indicia to indicate pages for which the selected one of the features has been altered from the default setting but which are set to a setting different than that of the page corresponding to the print preview image.

5. The method of claim 1, wherein the page selector comprises a scroll bar and wherein providing indicia includes providing indicia within the scroll bar.

6. The method of claim 1, wherein the page selector comprises a scroll bar and wherein providing indicia includes providing indicia adjacent the scroll bar.

7. The method of claim 1, wherein the selectable features include watermark selection, single-sided printing or double-sided printing selection, printing multiple pages per sheet, booklet printing selection, copies, colored text selection, target printer selection, paper source selection, stapling selection and output bin selection features.

8. An article of manufacture comprising a computer usable medium having computer readable code embodied therein to in operation cause a display to depict a graphical user interface for setting printer options, the graphical user interface including a first portion showing a list of print features, a second portion and a first divider separating the first and second portions, the second portion including a first sub portion displaying a print preview image showing content of a user-selected page within a document, a second sub portion and a second divider separating the first and second sub portions, the computer readable program code in the article of manufacture being configured to display a list of user-selectable printing features in the first portion, receive a selection of one of the user-selectable printing features, display a user-actuable control for the selected one of the features in the second sub portion, display a print preview image in the first sub portion which changes in response to actuation of the user-actuable control, display a page selector adjacent the print preview image for selecting a page to be displayed in the print preview image and display indicia showing which pages within the document have had the selected one of the features from the list altered from a default setting for that feature, the print preview image changing in response to operation of the page selector.

9. The article of manufacture of claim 8, the computer readable program code further being configured to display the list of user-selectable features as a scrollable list.

10. The article of manufacture of claim 8, the computer readable program code further being configured to receive a print command prior to displaying the list of user-selectable printing features.

11. The article of manufacture of claim 8, wherein the computer readable program code configured to display indicia comprises computer readable program code configured to display first indicia to indicate pages for which the selected one of the features has not been altered from the default setting, display second indicia to indicate pages for which the selected one of the features is set to the same setting as that of the page corresponding to the print preview image and display third indicia to indicate pages for which the selected one of the features has been altered from the default setting but which are set to a setting different than that of the page corresponding to the print preview image.

12. The article of manufacture of claim 8, wherein the page selector comprises a scroll bar and wherein the computer readable program code configured to display indicia includes computer readable program code configured to provide indicia within the scroll bar.

13. The article of manufacture of claim 8, wherein the page selector comprises a scroll bar and wherein the computer readable program code configured to display indicia includes computer readable program code configured to provide indicia adjacent the scroll bar.

14. The article of manufacture of claim 8, wherein the computer readable program code in the article of manufacture is configured to display a list of user-selectable printing features including watermarks, single-sided printing or double-sided printing, printing multiple pages per sheet, booklet printing, copies, colored text, target printer, paper source, stapling and output bin.

15. A computer implemented printer control system comprising:
    memory configured to provide an operating system and operative to store files representing at least one document to be printed;
    a display configured to provide an image of a graphical user interface in a viewing window, the graphical user interface configured to allow user selection and modification of print engine options for printing the document; and
    processing circuitry configured to display a list of user-selectable printing features in a first portion of the graphical user interface, receive a selection of one of the user-selectable printing features, display a user-actuable control for the selected one of the features in a second portion of the graphical user interface, display a print preview image in the second portion which changes in response to actuation of the user-actuable control, display a page selector adjacent the print preview image for selecting a page to be displayed in the print preview image and display indicia showing which pages within the document have had the selected one of the features from the list altered from a default setting for that feature.

16. The printer control system of claim 15, wherein the processing circuitry comprises a processor configured to display the list of user-selectable features as a scrollable list.

17. The printer control system of claim 15, wherein the processing circuitry is further configured to receive a print command prior to displaying the list of user-selectable printing features.

18. The printer control system of claim 15, wherein the processor configured to display indicia includes a processor configured to display first indicia to indicate pages for which the selected one of the features has not been altered from the default setting, display second indicia to indicate pages for which the selected one of the features is set to the same setting as that of the page corresponding to the print preview image and display third indicia to indicate pages for which the selected one of the features has been altered from the default setting but which are set to a setting different than that of the page corresponding to the print preview image.

19. The printer control system of claim 15, wherein the user-actuable control is a scroll bar adjacent the print preview image and the processor configured to provide indicia includes a processor configured to provide indicia adjacent the scroll bar showing which pages within the document have had a selected one of the features from the list altered from a default setting for that feature.

20. The printer control system of claim 15, wherein the user-actuable control is a scroll bar adjacent the print preview image and the processor configured to provide indicia includes a processor configured to provide indicia within the scroll bar showing which pages within the document have had a selected one of the features from the list altered from a default setting for that feature.

* * * * *